No. 877,762.
PATENTED JAN. 28, 1908.
P. A. DARRACQ.
OPERATING DEVICE FOR MOTOR VEHICLES.
APPLICATION FILED MAR. 29, 1907.
2 SHEETS—SHEET 1.
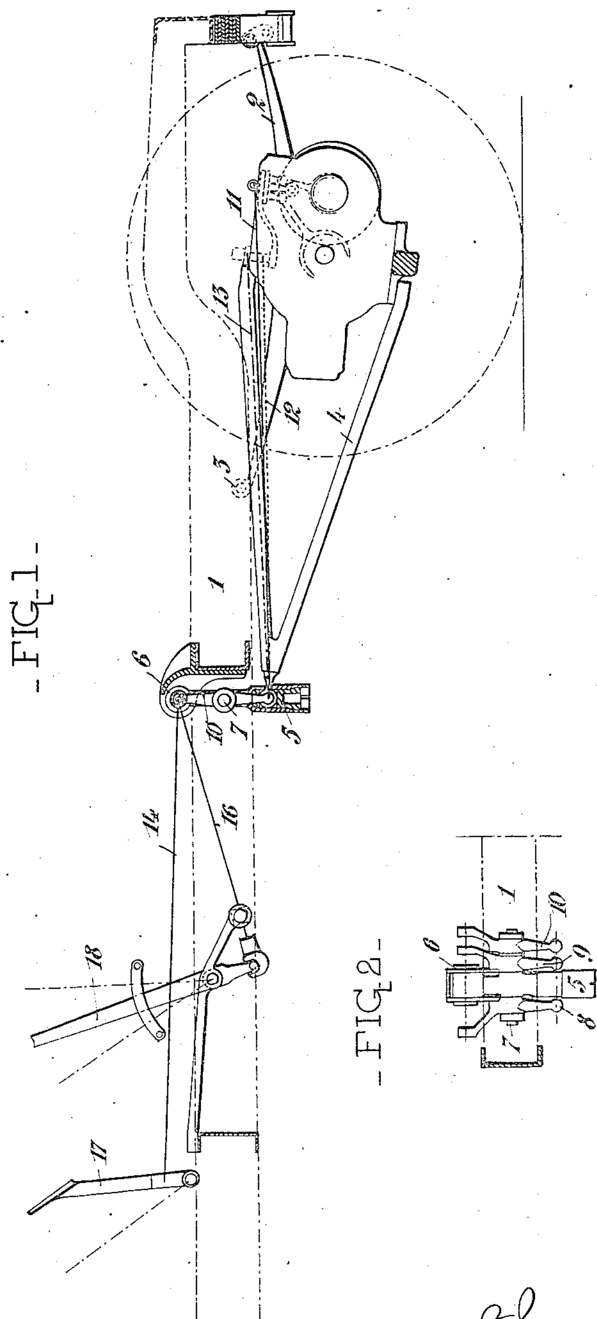
Witnesses:
C. M. Boulter
[signature]
Inventor:
Pierre A. Darracq,
By Wm. E. Boulter,
attorney No. 877,762.
PATENTED JAN. 28, 1908.
P. A. DARRACQ.
OPERATING DEVICE FOR MOTOR VEHICLES.
APPLICATION FILED MAR. 29, 1907.
2 SHEETS—SHEET 2.
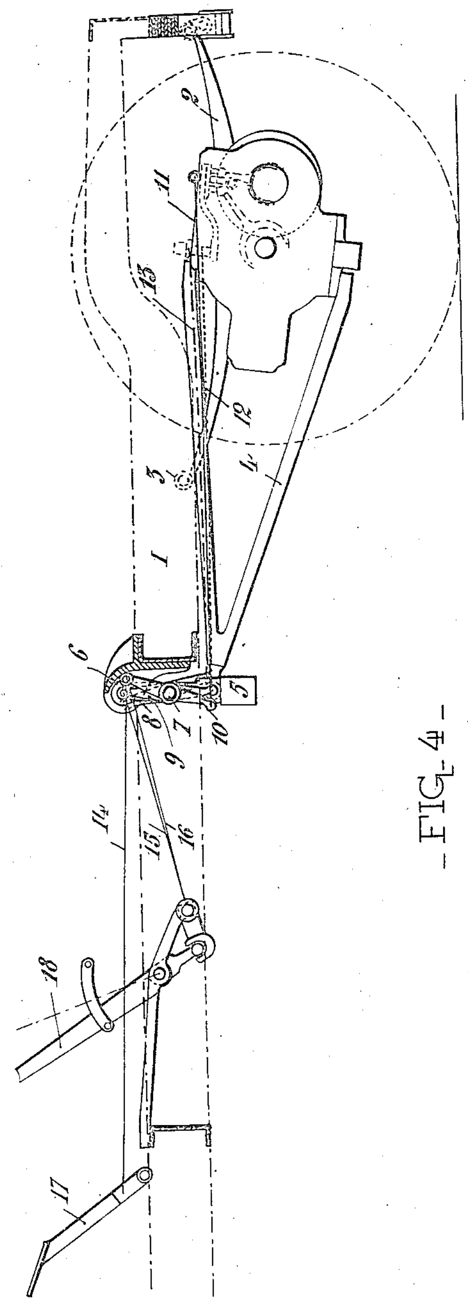
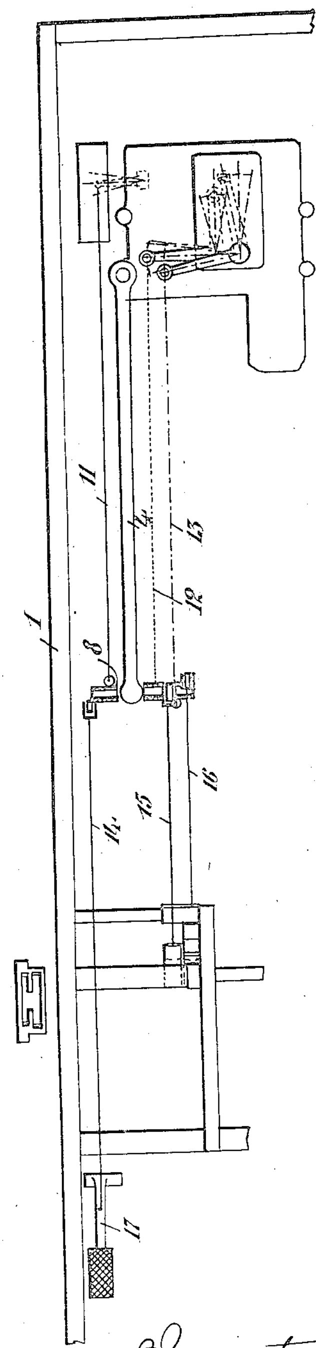
Witnesses:
C. M. Boulter
C. S. Northrup.
Inventor:
Pierre A. Darracq,
By Wm. E. Boulter
Attorney

UNITED STATES PATENT OFFICE.

PIERRE ALEXANDRE DARRACQ, OF SURESNES, FRANCE, ASSIGNOR TO SOCIÉTÉ A. DARRACQ & CIE. (1905) LTD., OF SURESNES, FRANCE.

OPERATING DEVICE FOR MOTOR-VEHICLES.

No. 877,762. Specification of Letters Patent. Patented Jan. 28, 1908.

Application filed March 29, 1907. Serial No. 365,323.

*To all whom it may concern:*

Be it known that I, PIERRE ALEXANDRE DARRACQ, a citizen of the French Republic, and a resident of Suresnes, France, have invented certain new and useful Improvements in Operating Devices for Change-Speed, Reversing, and Brake Gear for Motor-Vehicles, of which the following is a specification.

This invention relates to a device for controlling the change speed, reversing and brake parts of motor vehicles, chiefly applicable when the whole of the mechanism, comprising the change speed gear, the reversing gear and the brake device, is movable relatively to the points of control of its various parts, and more particularly when the said mechanism is mounted on the rear axles of the vehicle.

In the accompanying drawing illustrating by way of example a typical mounting of a car with a rear driving axle; Figure 1 is a longitudinal view of the device according to this invention, the controlling and operating levers occupying the central position corresponding to all the parts being thrown out of gear; Fig. 2 is a side elevation corresponding to Fig. 1 of the levers for operating the brake and the change speed and reversing gears; Fig. 3 shows the same device as Fig. 1, with the levers occupying one of their end positions corresponding to one of their actions; Fig. 4 is a plan of the device corresponding to Fig. 3.

The back axle is connected to the frame 1 in the usual manner by springs 2 of which one end is secured to the said frame in such manner that the axle drives the vehicle through the springs. The reaction of the driving couple or torque is taken up by the triangular part 4 called radius fork, secured on the one hand rigidly to the back axle, and on the other hand connected in an adjustable manner to the frame at a suitably chosen point of the same. In order to enable the end of the triangular part 4 connected to the frame, to follow the movements of the back axle, produced by the springs 2, it is connected to the said frame by means of a balance beam 5 capable of oscillating on a pin 6 secured to the frame 1, the said balance beam comprising the joint of the corresponding end of the triangular part 4. If there be no part to be controlled on the back axle, the said method of mounting is practical and economical, but when the change speed gear is placed on the said back axle, there is a difficulty in operating the loose wheel set or sets, the brakes, etc.—parts which are usually mounted on the frame. In fact, the levers or pedals for operating the said various parts are always secured to the frame at the points the most convenient for their operation and for the driving of the vehicle, and the result is that the movements of the back axles in the above mentioned method of mounting, interfere with the movements or immobility of the operating parts secured to the frame, and affect their good working. In such cases, recourse is generally had to very complicated devices which do not afford any guarantee from the point of view of the control to be effected.

The device according to the present invention has the double advantage of being simple and strong, and at the same time of possessing the necessary elasticity for following the deformations of the springs. According to the said device, the movements to be operated on the back axle are effected along the longitudinal axis of the car, the movements of the controlling and operating levers taking then place in planes parallel to the said axis.

The balance beam 5 of the triangular part 4 supports at a point near its center and at a right angle a transverse spindle 7 on which are mounted, with a slight amount of friction, as many levers as there are parts to be controlled. In the example illustrated, three levers are pivoted to the spindle 7. The lever 8 corresponds to the control of the brake pulley, the lever 9 to the control of the change speed gear (second and third speed, for instance) and finally the lever 10 to the control of the first speed and of driving backwards. The said double levers 8 9 10 have a uniform length, such that the axis of one of their ends coincides with the axis of the joint of the balance beam 5 on the frame 1, while the axis of their other ends coincides with the axis of the joint of the head of the triangular part 4 to the balance beam. The lower ends of the said double levers 8 9 10 are respectively connected by rods 11 12 and 13 to the movable parts to be controlled on the mechanism of the back axle, their upper ends being respectively connected by rods 14 15 and 16 to the corresponding operating parts, brake pedal 17 and hand lever 18 for changing speed.

It follows from the said arrangement that the transmission of movement from the levers or pedals to the corresponding parts of the back axle, is not affected by the movements of the said axle relatively to the frame, since the said movements are followed by the triangular part 4, owing to the oscillation of the balance beam 5 about its pivot 6, the said balance beam 5 causing the spindle 7 and consequently the double levers 8 9 10 mounted on the latter to participate in its movements. The length of the operating and controlling rods 11 12 13 14 15 16 being a constant one, when the double levers 8 9 and 10 are in the central position, the spindle 6 of the balance beam 5 being fixed, the ends of the said double levers 8 9 10 corresponding to the said spindle 6, are also fixed, and as the said ends are respectively connected to the operating parts, the whole mechanism will behave as if the back axle were rigidly fixed to the frame, whereby the best possible conditions for the working of the various controlling parts are insured. This condition is fulfilled in a mathematically correct way only for the central position shown in Fig. 1. When, for the requirements of operating, the double levers 8 9 and 10 have to move out of the said central position as shown in Fig. 2, to the extent of an angle which must be made as small as possible by making the said levers 8 9 10 of suitable length, the axes of the upper ends of the same no longer coincide exactly with the spindle 6 of the joint of the balance beam 5, and the upper ends of the double levers 8 9 10 no longer remain strictly fixed (as in the case of the central position), when a deformation of the springs takes place. Nevertheless, as owing to the said deformation the paths traveled by the balance beam 5 and by the double levers 8 9 10 cannot be described except about the joint 6 of the said balance beam 5, it follows that the movements of the parts must be considered as insignificant, and do not modify the distance of the levers controlling the movable parts to be operated, which makes it possible to use rods as intermediate rigid parts for transmitting the movement.

What I claim as my invention and desire to secure by Letters Patent is:—

1. In a device for controlling change speed, reversing and brake parts for motor vehicles the combination of a frame, springs on said frame, a driving axle secured to said springs, a change speed a reversing and a braking device upon said axle, a pivoted balance beam on said frame, a fork connecting said balance beam and said axle, means upon said beam for pivotally supporting a plurality of levers, means connecting said levers to the devices upon said axle and means to enable the driver to operate said levers.

2. In a device for controlling change speed, reversing and brake parts for motor vehicles the combination of a frame, springs on said frame, a driving axle secured to said springs, a change speed a reversing and a braking device upon said axle a balance beam pivoted on said frame, a triangular part secured to said axle and said balance beam, a spindle on said beam, levers pivoted on said spindle and means for controlling said change speed reversing and braking devices attached to the ends of said levers.

3. In a device for controlling change speed, reversing and brake parts for motor vehicles the combination of a frame, springs on said frame, a driving axle secured to said springs, a change speed a reversing and a braking device upon said axle, a balance beam pivoted on said frame, a triangular part secured to said axle and said balance beam, a spindle on said beam, levers pivoted intermediate their ends on said spindle, rods attached to said levers for controlling said change speed, reversing and braking devices, the connecting point of said rods corresponding to the connecting point of said triangular part and balance beam and controlling rods attached to the other end of said levers having connecting points corresponding to the pivoting point of said balance beam.

4. In a device for controlling change speed, reversing and brake parts for motor vehicles the combination of a frame, springs on said frame, a driving axle secured to said springs, a change speed, a reversing and a braking device upon said axle, a pivoted balance beam on said frame, a fork connecting said balance beam and said axle, means upon said beam for pivotally supporting a plurality of levers, rods connecting said levers to the devices upon said axle the axes of connection of said rods with their levers corresponding to the axis of the pivoting point of said balance beam, and rods connecting said levers to controlling devices, the axes of connection of said last mentioned rods with their levers corresponding to the axis of the connection of said fork and balance beam.

In testimony whereof I have signed my name to this specification in the presence of two subscribing witnesses.

PIERRE ALEXANDRE DARRACQ.

Witnesses:
DEAN B. MASON,
JEAN ROBELET.